United States Patent
Zhou et al.

(10) Patent No.: US 10,264,581 B1
(45) Date of Patent: Apr. 16, 2019

(54) PROVIDING CELLULAR SERVICE ON PARTIALLY-OVERLAPPING CARRIERS

(71) Applicant: Sprint Spectrum L.P., Overland Park, KS (US)

(72) Inventors: Yu Zhou, Herndon, VA (US);
Shahzada Rasool, Vienna, VA (US);
Muhammad A. Naim, Ashburn, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 187 days.

(21) Appl. No.: 15/374,439

(22) Filed: Dec. 9, 2016

(51) Int. Cl.
| | | |
|---|---|---|
| H04W 72/04 | (2009.01) | |
| H04W 72/00 | (2009.01) | |
| H04L 5/00 | (2006.01) | |
| H04W 74/00 | (2009.01) | |
| H04W 74/08 | (2009.01) | |

(52) U.S. Cl.
CPC ....... *H04W 72/0453* (2013.01); *H04L 5/0048* (2013.01); *H04W 72/005* (2013.01); *H04W 74/006* (2013.01); *H04W 74/0833* (2013.01)

(58) Field of Classification Search
None
See application file for complete search history.

(56) References Cited

U.S. PATENT DOCUMENTS

| | | | |
|---|---|---|---|
| 7,769,073 B2* | 8/2010 | Yarkosky | H04W 16/12 375/130 |
| 9,363,271 B1 | 7/2016 | Puliatti et al. | |
| 9,451,554 B1 | 9/2016 | Singh et al. | |
| 9,736,699 B1 | 8/2017 | Rao | |
| 2007/0143486 A1 | 6/2007 | Kang et al. | |
| 2010/0234040 A1* | 9/2010 | Palanki | H04W 52/244 455/452.2 |
| 2013/0309971 A1 | 11/2013 | Kiukkonen et al. | |
| 2014/0010086 A1 | 1/2014 | Etemad et al. | |
| 2014/0161016 A1 | 6/2014 | Morioka et al. | |
| 2016/0095118 A1* | 3/2016 | Mizusawa | H04J 11/005 455/452.2 |
| 2016/0142911 A1 | 5/2016 | Kreiner et al. | |
| 2017/0019900 A1 | 1/2017 | McNamara et al. | |
| 2017/0257772 A1* | 9/2017 | Zhou | H04L 5/001 |

OTHER PUBLICATIONS

Office Action from U.S. Appl. No. 15/434,451, dated Jun. 14, 2018.
First Action Interview Pilot Program Pre-Interview Communication from U.S. Appl. No. 15/630,518, dated Apr. 2, 2018.
U.S. Appl. No. 15/630,518, filed Jun. 22, 2017.
U.S. Appl. No. 15/434,451, filed Feb. 16, 2017.

* cited by examiner

*Primary Examiner* — Saumit Shah

(57) ABSTRACT

A method and system to help facilitate efficient use of frequency spectrum. A base station will provide service on two carriers that partially overlap with each other in frequency. To facilitate this, the base station could shift the frame timing of one carrier in relation to the other carrier, so as to minimize or avoid overlap of the carriers' downlink control channels. Further, the base station could control service on each carrier in a manner that helps avoid resource conflicts within the overlapping frequency region.

11 Claims, 11 Drawing Sheets

PROVIDE SERVICE ON FIRST AND SECOND CARRIERS WITHIN A FREQUENCY RANGE, WHERE EACH CARRIER HAS A RESPECTIVE CONTIGUOUS BANDWIDTH, AND WHERE THE CARRIERS PARTIALLY OVERLAP WITH EACH OTHER, THE PARTIAL OVERLAP DEFINING AN OVERLAPPING FREQUENCY REGION ENCOMPASSING A HIGH END OF THE FIRST CARRIER AND A LOW END OF THE SECOND CARRIER — 90

IN THE OVERLAPPING FREQUENCY REGION, CONTROL SCHEDULING OF SHARED-CHANNEL RESOURCES TO AVOID RESOURCE CONFLICTS AS BETWEEN THE CARRIERS — 92

PROVIDING CELLULAR SERVICE ON PARTIALLY-OVERLAPPING CARRIERS

BACKGROUND

A typical wireless communication system includes a number of base stations each radiating to provide coverage in which to serve wireless client devices (WCDs) such as cell phones, tablet computers, tracking devices, embedded wireless modules, and other wirelessly equipped devices. In turn, each base station may sit as a node on a core access network that includes entities such as a network controller and a gateway system that provides connectivity with an external transport network such as the Internet. With this arrangement, a WCD within coverage of the system may engage in air interface communication with a base station and may thereby communicate via the base station with various remote network entities or with other WCDs served by the base station.

Such a system may operate in accordance with a particular air interface protocol, examples of which include, without limitation, Orthogonal Frequency Division Multiple Access (OFDMA (e.g., Long Term Evolution (LTE) and Wireless Interoperability for Microwave Access (WiMAX)), Code Division Multiple Access (CDMA) (e.g., 1×RTT and 1×EV-DO), Global System for Mobile Communications (GSM), IEEE 802.11 (WIFI), BLUETOOTH, and others.

In accordance with the air interface protocol, a base station may provide service on one or more carriers, each spanning particular radio-frequency on which communications can flow wirelessly between the base station and WCDs. Such a carrier could be structured to provide a downlink for carrying communications from the base station to WCDs and an uplink for carrying communications from WCDs to the base station. For instance, the carrier could be frequency division duplex (FDD), with separate frequency ranges provided respectively for downlink and uplink communication, or time division duplex (TDD), with a single frequency range being time division multiplexed between downlink and uplink use.

Through modulation or other means on the carrier, the downlink and uplink could then be structured to define various channels for carrying communications between the base station and WCDs. For instance, the downlink could be structured to define one or more traffic channels for carrying bearer data from the base station to WCDs and one or more control channels for carrying control signaling from the base station to WCDs. And the uplink could define one or more traffic channels for carrying bearer data from WCDs to the base station and one or more control channels for carrying control signaling from WCDs to the base station.

OVERVIEW

A representative air interface protocol may support carriers that have specific frequency bandwidths (as the frequency ranges of the downlink and uplink using FDD carrier, or as the shared downlink/uplink frequency range using TDD). For example, LTE supports carriers that have bandwidths of 1.4 MHz, 3 MHz, 5 MHz, 10 MHz, 15 MHz, and 20 MHz. Thus, LTE base stations could be configured to provide service on one or more carriers each having one those supported LTE bandwidths. To facilitate this, a wireless service provider could license radio frequency spectrum from a governing entity and could configure base stations to provide service on carriers of such bandwidths within the licensed spectrum. For instance, an LTE service provider could license a swath of spectrum in a defined frequency band and divide the spectrum into discrete 5 MHz or 10 MHz segments each for use as a respective carrier (or as a downlink or uplink channel of an FDD carrier), and the service provider could configure base stations to provide service on those carriers.

Due to licensing anomalies and/or for other reasons, a wireless service provider may face a scenario where the service provider has a range of frequency spectrum that does not neatly fit one of the supported carrier bandwidths. For example, an LTE service provider may have a 7 MHz swath of frequency spectrum, and the service provider could define a 5 MHz LTE carrier in that spectrum, but the service provider would then have 2 MHz of leftover, potentially unused spectrum. And as another example, an LTE service provider may have a 16 MHz swath of frequency spectrum, and the service provider could define a 15 MHz carrier in that spectrum, but the service provider would then have 1 MHz of leftover, potentially unused spectrum.

Disclosed herein is a method and system to help facilitate efficient use of frequency spectrum in these or other situations. In accordance with the disclosure, a base station will be configured to provide service on two carriers that partially overlap with each other in frequency. For instance, given a 7 MHz range of frequency spectrum, two partially overlapping 5 MHz carriers could be defined, such as with one starting at a low end of the 7 MHz range and extending up by 5 MHz, and the other starting 2 MHz up in the 7 MHz range and extending to the high end of the 7 MHz range. Or given a 16 MHz range of frequency spectrum, two partially overlapping 10 MHz carriers could be defined, such as with one starting at a low end of the 16 MHz range and extending up by 10 MHz, and the other starting 6 MHz up in the 16 MHz range and extending to the high end of the 16 MHz range.

To facilitate this, the base station may shift the frame timing of one carrier in relation to the other carrier, so as to minimize or avoid overlap of the carriers' downlink control channels. Further, the base station may control service on each carrier in a manner that helps avoid resource conflicts within the overlapping frequency region.

Accordingly, in one respect, disclosed is a method for a base station to provide cellular wireless service on a plurality of overlapping carriers within a frequency range. As disclosed, the base station would provide service on first and second carriers within the frequency range, each carrier having a respective contiguous bandwidth, the carriers partially overlapping with each other, and the partial overlap defining an overlapping frequency region encompassing a high end of the first carrier and a low end of the second carrier, such that each carrier comprises (i) a respective carrier-only frequency region and (ii) the overlapping frequency region. Further, in the overlapping frequency region, the base station would then control scheduling of shared-channel resources to avoid resource conflicts as between the carriers.

In another respect, disclosed is method for a base station to provide cellular wireless service on partially overlapping carriers within a frequency range. As disclosed, the base station would operate on first and second carriers within the frequency range, each carrier having a respective contiguous bandwidth, the carriers partially overlapping with each other, and the partial overlap defining an overlapping frequency region encompassing a high end of the first carrier and a low end of the second carrier, such that each carrier comprises (i) a respective carrier-only frequency region and (ii) the overlapping frequency region.

With such an arrangement, the base station would then provide cellular wireless service on each of the carriers respectively in a continuum of subframes, with the subframes on both carriers being a common subframe duration, and each of the subframes being divided over time into at least a respective control-channel region and a respective shared-channel region. To facilitate this in practice, the base station will time-shift the continuum of subframes on the first carrier from the continuum of subframes on the second carrier by a duration that is less than the subframe duration and that is sufficient to prevent the control-channel regions on each carrier from overlapping in time with the control-channel regions on the other carrier. Further, in the overlapping frequency region respectively on each carrier, the base station will restrict the shared-channel region in each subframe to extend in time only so much as to not overlap with an adjacent control-channel region of the other carrier.

Still further, in another respect, disclosed is a method for a base station to provide cellular wireless service within a frequency range. As disclosed, the base station will provide service on first and second carriers within the frequency range, with each carrier having a respective contiguous bandwidth extending from a low end to a high end, and each carrier having (i) a low-end control-channel region at the low-end of the carrier, (ii) a high-end control channel region at the high-end of the carrier, and (ii) a shared-channel region extending from the low-end control-channel region to the high-end control-channel region.

With this arrangement, the first and second carriers would partially overlap each other, and the overlap would define an overlapping frequency region that encompasses (i) the high-end control-channel region of the first carrier, (ii) an overlap of the shared-channel regions of the first and second carriers and (iii) the low-end control-channel region of the second carrier. Further, on each carrier, the base station would receive uplink control signaling in the low-end control-channel region of the carrier and high-end control channel region of the carrier, the base station would schedule uplink shared-channel communication to occur within the shared-channel region of the carrier, and the base station would avoid concurrent allocation of identical shared-channel resources in the overlapping frequency region.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Figure 1:
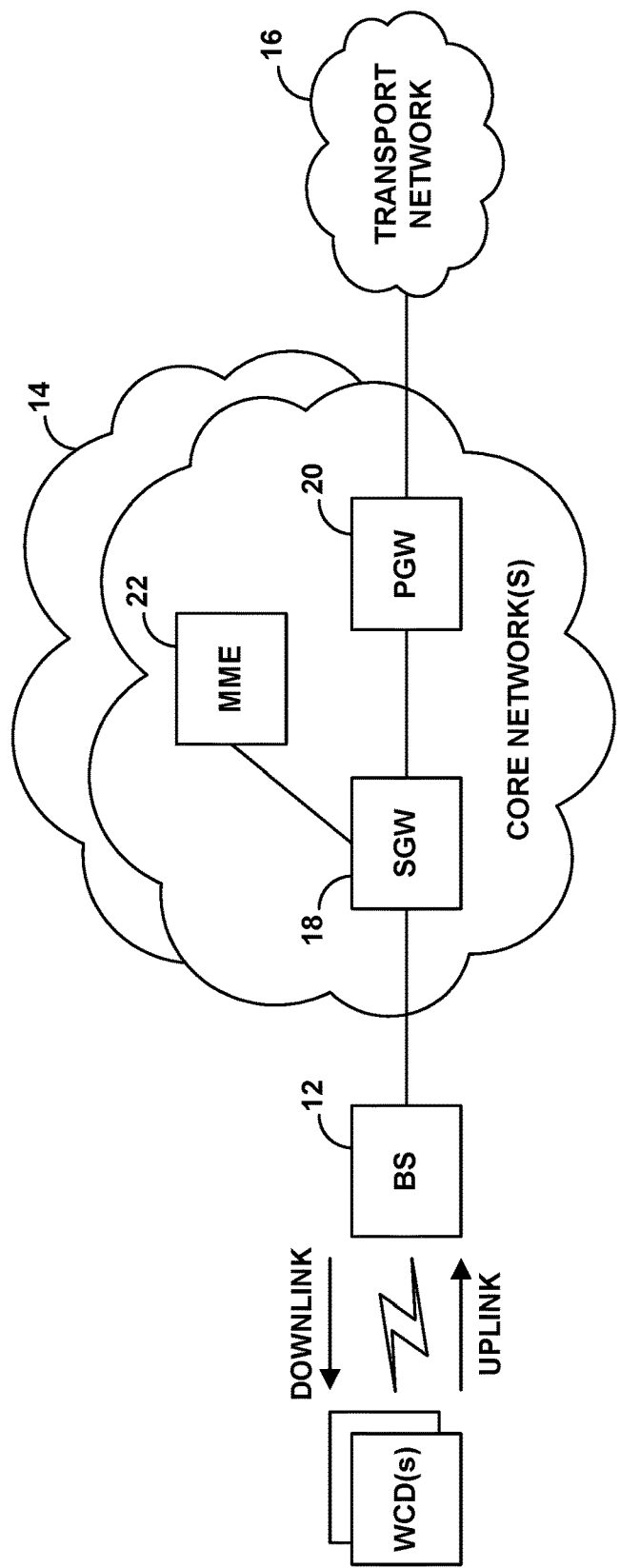
FIG. 1 is a simplified block diagram of an example LTE network.

The present method and apparatus will be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Referring to the drawings, as noted above, FIG. 1 is a simplified block diagram of an example LTE network. This network functions primarily to serve WCDs with wireless packet data communication service, including possibly voice-over-packet service, but may also provide other functions. As shown, the LTE network includes a representative LTE base station (evolved Node-B (eNodeB)) 12, which would have an antenna structure and associated equipment for providing a respective LTE coverage area in which to serve WCDs. This base station could take any of a variety of forms, such as a macro base station, a small cell base station, and/or a relay base station, among other possibilities. Likewise, the WCDs could take various forms, such as any of those noted above for instance.

As further shown, the base station has a communication interface with one or more core networks 14 each operated by a service provider or operator, and each of which may provide connectivity with a transport network 16 such as the Internet. In an example arrangement, for instance, the base station could provide connectivity with a single operator's core network and could be configured to serve WCDs that subscribe to service from that operator. And in another example arrangement, the base station could provide connectivity with two or more operators' core networks and could be configured to serve WCDs that subscribe to service from any of those operators. FIG. 1 depicts example components of an example core network. In particular, the example core network could include a serving gateway (SGW) 18, a packet-data-network gateway (PGW) 20, and a mobility management entity (MME) 22.

As noted above, a representative base station may provide service on one or more carriers, each defining a downlink and an uplink. For instance, the base station could provide service on an FDD carrier that defines separate downlink and uplink frequency ranges and/or on a TDD carrier that defines a frequency range time division multiplexed between downlink and uplink use. In either case, the carrier bandwidth could optimally be one of the standard LTE bandwidths noted above. More particularly, each carrier can be characterized by its center frequency and its bandwidth centered on that frequency.

In accordance with the LTE protocol, the air interface on the carrier is subdivided in the time domain and the frequency domain to define an array of resource elements for carrying modulated communications between the base station and WCDs. In particular, in the time domain, the air interface defines a continuum of 10-millisecond (ms) frames, each of which is divided into ten 1-ms subframes, and each subframe is then further divided into fourteen 66.67-microsecond (µs) symbol time segments. And in the frequency domain, the carrier bandwidth is divided into 15-kHz subcarriers (as many as would fit within the carrier bandwidth). With this arrangement, the air interface on the carrier thus defines an array of resource elements each occupying a 15 kHz subcarrier and spanning a 66.67 µs symbol time segment, and the base station and WCDs can communicate with each other through modulation of data in these resource elements.

LTE then designates certain ones of these resource elements on the downlink and uplink to be used as control and traffic channels as noted above.

For instance, on the downlink, the first one, two or three symbol time segments per subframe (or per downlink subframe in TDD) across the carrier bandwidth generally define a downlink control region, primarily as a physical downlink control channel (PDCCH), for carrying control signaling from the base station to WCDs. And the remaining symbol time segments per subframe across the carrier bandwidth generally define a downlink shared channel region, as a physical downlink shared channel (PDSCH), for carrying scheduled data communications from the base station to WCDs.

In addition, certain resource elements on the downlink are reserved for other purposes. For instance, in the sixth and seventh symbol time segments of the first and sixth subframe of each frame, a group of 62 resource elements centered in the carrier bandwidth are reserved as synchronization channels, for carrying primary and secondary carrier-synchronization signals that WCDs can detect as a basis to determine the frame timing. Further, the eighth through eleventh symbol time segments across the carrier bandwidth in the first subframe per frame are generally reserved to define a physical broadcast channel (PBCH) for carrying system information broadcast messages. And particular resource elements distributed in a defined reference-signal pattern throughout the carrier bandwidth per subframe are reserved to carry a cell-specific reference signal, which WCDs can detect as a basis to evaluate coverage strength.

On the uplink, on the other hand, groups of resource elements that span the 1-ms subframe duration at the low end and high end of the carrier bandwidth generally define an uplink control region, primarily as a physical uplink control channel (PUCCH), for carrying control signaling from WCDs to the base station. And the resource elements in between the low and high end PUCCH resource elements generally define an uplink shared channel region, as a physical uplink shared channel (PUSCH), for carrying scheduled data communications from WCDs to the base station.

Further, certain resource elements on the uplink are reserved for other purposes as well. For instance, particular groups of resource elements are reserved to define a physical random access channel (PRACH), for carrying random access control signaling from WCDs to the base station. And other groups of resource elements are reserved to carry WCD reference signals (sounding reference signals) that the base station can use to evaluate WCD uplink timing and the like.

In practice, a WCD configured for LTE service may be provisioned or provided with a list of carriers on which the WCD can operate, designating each carrier by its center frequency and bandwidth for instance. When the WCD first powers on, the WCD may thus detect coverage on such a carrier and scan for a primary synchronization signal on the carrier in order to determine the carrier frame timing. In particular, the WCD may read the 62 centrally located resource elements over time on the carrier until the WCD finds that those resource elements carry a primary synchronization signal of a predefined form or value. Given knowledge of the relative time position of that primary synchronization signal within a frame as noted above, the WCD may thereby learn the frame timing, so that the WCD can then read other downlink communications on the carrier.

Further, based on the primary synchronization signal value, the WCD may determine the reference-signal pattern on the carrier, defining which resource elements per subframe carry the cell-specific reference signal, so that the WCD can then evaluate coverage strength on the carrier. In particular, a modulo-3 function of the primary synchronization signal value establishes which of three possible reference-signal patterns the base station uses. So the WCD may read the primary synchronization signal value and compute that modulo-3 function so as to determine which resource elements per subframe carry the reference signal on the carrier. And the WCD may then evaluate transmission strength on those resource elements, to evaluate coverage strength.

Assuming the WCD finds sufficient coverage strength, the WCD may then engage in signaling with the base station to register for service. In particular, the WCD may read the PBCH to determine where the PRACH is located on the uplink, and the WCD may then transmit a random access signaling message to the base station on the PRACH. Through further signaling, the base station and WCD may then establish a radio-link-layer connection (Radio Resource Control (RRC) connection), and the WCD may transmit an attach request, which the base station may forward to the MME for processing. In turn, the MME may then coordinate establishment for the WCD of one or more bearers for carrying data between the WCD and the PGW.

Once the WCD is so attached, the base station may then serve the WCD in a connected mode, allowing the WCD to engage in communication on the transport network 16.

For instance, when packet data arrives from the transport network for the WCD, the data would pass to the base station, and the base station would then schedule transmission of the data to the WCD on the PDSCH of a subframe. In that subframe, the base station would then transmit in the PDCCH a downlink control information (DCI) message that is masked with an identifier of the WCD and that designates the PDSCH resources that will carry the data, and the base station would transmit the data in the designated PDSCH resources. Through a process of blind-decoding on the PDCCH of each subframe, the WCD then find that DCI message in the subframe at issue, read the DCI message, and read the data from the PDSCH.

Likewise, when the WCD has packet data to transmit on the transport network, the WCD may transmit a scheduling request in PUCCH resources, and the base station would then schedule transmission of the data on the PUSCH of a subframe. With predefined timing in advance of that subframe, the base station would then transmit in a PDCCH a DCI message that is masked with an identifier of the WCD and that designates the PUSCH resources that the WCD should use for transmission of the data. And the WCD would then transmit the data in those designated PUSCH resources.

In practice, if a base station provides coverage on multiple carriers, the base station would have common timing across the carriers. That is, a new frame would begin at the same moment on all of the carriers and would end at the same moment on all of the carriers. Thus, the subframes of the carriers would be time aligned with each other as well.

In accordance with the present disclosure, as noted above, a base station will provide service on at least two carriers that the base station will configure to partially overlap with each other in frequency. As noted above, for instance, given a frequency range in which to define the carriers, the base station could provide two carriers, one starting at the low-end of the frequency range and extending just partly up the frequency range, and the other starting partly up the frequency range and extending to the high-end of the frequency range. These carriers could have the same frequency bandwidth as each other or different frequency bandwidths than each other. In any event, with such an arrangement, each carrier would have a carrier-only frequency region, and the carriers would overlap with each other in an overlapping frequency region.

Figure 2:
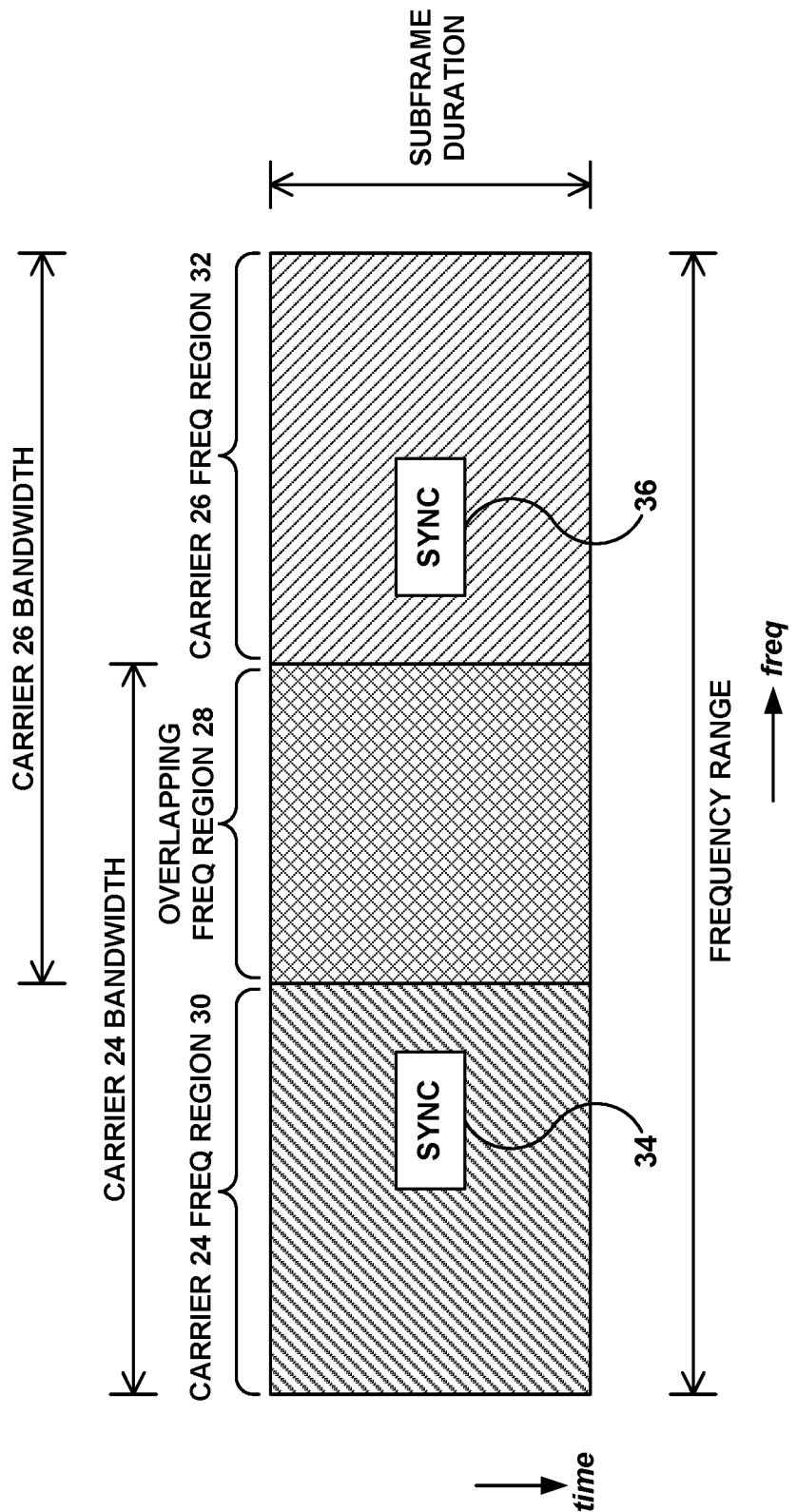
FIG. 2 is an illustration of partially overlapping carriers in a frequency range.

FIG. 2 depicts this arrangement by way of example. In particular, FIG. 2 shows an example 16 MHz frequency range in which a base station could define and provide service on two partially overlapping 10 MHz carriers (not shown proportionately) 24, 26. Carrier 24 is shown extending from the low-end of the 16 MHz frequency range up to 10 MHz into the range, and carrier 26 is shown extending from 6 MHz into the frequency range up to the high-end of the range. With this arrangement as shown, the carriers partially overlap with each other, with the partial overlap defining an overlapping frequency region 28 of 4 MHz that encompasses a high end of carrier 24 and a low end of carrier 26. As a result, carrier 24 comprises a carrier-only frequency region 30 and the overlapping frequency region 28, and carrier 26 comprises a carrier-only frequency region 32 and the overlapping frequency region 28.

In order for a base station to provide these partially overlapping carriers, the base station could be configured to implement on each carrier certain conventional downlink channels, such as the PDCCH, PDSCH, PBCH, and synchronization channels discussed above.

Optimally in doing this, the overlapping frequency region 28 would be wide enough in relation to the bandwidths of the carriers such that the synchronization channels of the carriers would not overlap with each other. This arrangement is further illustrated in FIG. 2. In particular, carrier 24 is shown including respective carrier-synchronization channels (labeled SYNC) 34 centrally located in the carrier bandwidth, where the base station would broadcast the carrier-synchronization signals for carrier 24. And carrier 26 is shown including respective carrier-synchronization channels (labeled SYNC) 36 centrally located in the carrier bandwidth, where the base station would broadcast the carrier-synchronization signals for carrier 26.

(Note that, in some implementations of this configuration, the synchronization channels of one carrier might exist at least in part within the overlapping frequency region 28. This could happen for certain size frequency ranges and carrier bandwidths if the overlapping frequency range 28 is so wide that it extends into the central group of resource elements in either carrier that would define the synchronization channels of the carrier. For instance, this could happen if the frequency range at issue is 7 MHz and two partially overlapping 5 MHz carriers are defined with an overlapping frequency region of 3 MHz, as at least part of the synchronization channels of each carrier would then exist partly in the overlapping frequency region 28. Faced with such an arrangement, the base station could take care to avoid scheduling transmissions in the overlapping frequency region on one carrier that would conflict with the synchronization channels of the other carrier. For instance, the base station could avoid scheduling transmissions on those resource elements.)

With this arrangement, the base station thus broadcasts the carrier-synchronization signals of carrier 24 on different subcarriers of frequency range 22 than those on which the base station broadcasts the carrier-synchronization signals of carrier 26. As a result, WCDs can separately detect and synchronize with the two carriers. For instance, a WCD could detect the carrier-synchronization signals broadcast on carrier 24 and thereby determine the frame timing of carrier 24 and proceed to be served by the base station carrier 24. And alternatively or additionally, a WCD could detect the carrier-synchronization signals broadcast on carrier 26 and thereby determine the frame timing of carrier 26 and proceed to be served by the base station carrier 24.

Furthermore, in providing these partially overlapping carriers, the base station could be configured to use the same reference signal pattern for each carrier, so as to help reduce wasted resources per carrier in the overlapping region. To facilitate this, the base station could set the primary synchronization signal value on each carrier so that the modulo-3 function of each carrier's primary synchronization signal value is the same, thus establishing the same reference-signal pattern for each carrier. And the base station could broadcast the reference signals on the carriers accordingly.

As may be evident from the depiction in FIG. 2, one issue that could arise from having two carriers overlap in frequency in this manner is that the carriers' control regions (e.g., PDCCHs) would overlap with each other in the overlapping frequency region 28. Unfortunately, this could lead to reduced PDCCH capacity per carrier, which would be undesirable.

To help overcome this issue, as further noted above, the base station could be further configured to time-shift the frames (and thus subframes) of one carrier in relation to the other by an extent that is less than the subframe duration but that is sufficient to prevent the control region on each carrier from overlapping in time with the control region on the other carrier.

Figure 3:
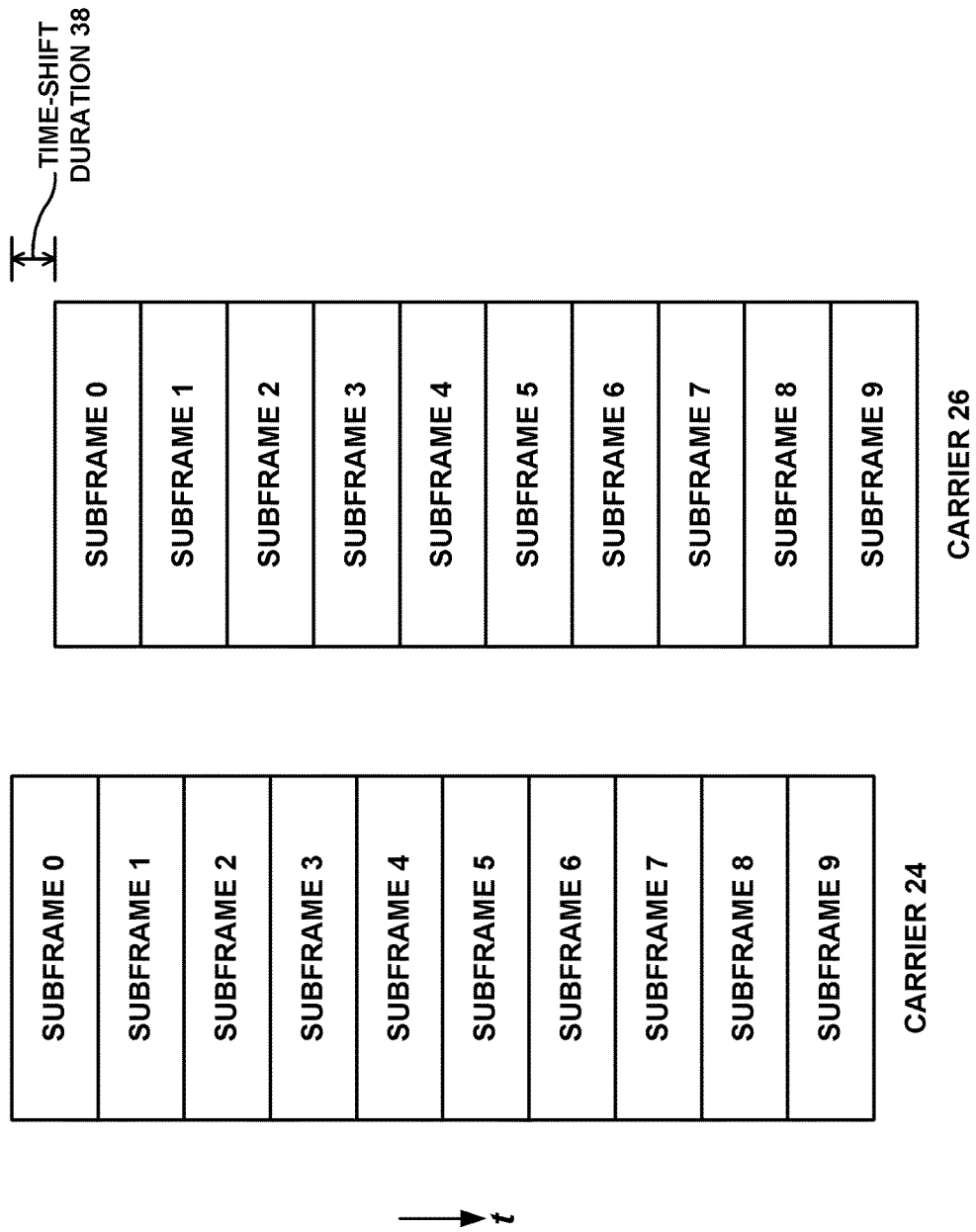
FIG. 3 is an illustration of time-shifted frames to help facilitate implementation of partially overlapping carriers.

FIG. 3 illustrates this time-shifting of frames (and thus of subframes) of one carrier in relation to the other carrier. In particular, FIG. 3 depicts a frame of carrier 24 time shifted by a duration in relation to a frame of carrier 26. With this arrangement, considering the continuum of subframes on each carrier, the continuum of subframes on carrier 24 would be time-shifted by the duration 38 as a whole from the continuum of subframes on carrier 26.

To facilitate this in practice, the base station could time-shift by duration 38 all of the communications that the base station provides or schedules on one carrier in relation to the other carrier. This includes the synchronization signals, which establish the frame timing. By time-shifting the synchronization signals of one carrier by duration 38 from the synchronization signals of the other carrier, the base station can thus establish the overall time-shifting of the frames (and thus subframes) of one carrier by duration 38 from the frames (and thus subframes) of the other carrier. In practice, the time-shift duration 38 could be additionally set such that the carriers' reference signals would align with each other as noted above.

Figure 4:
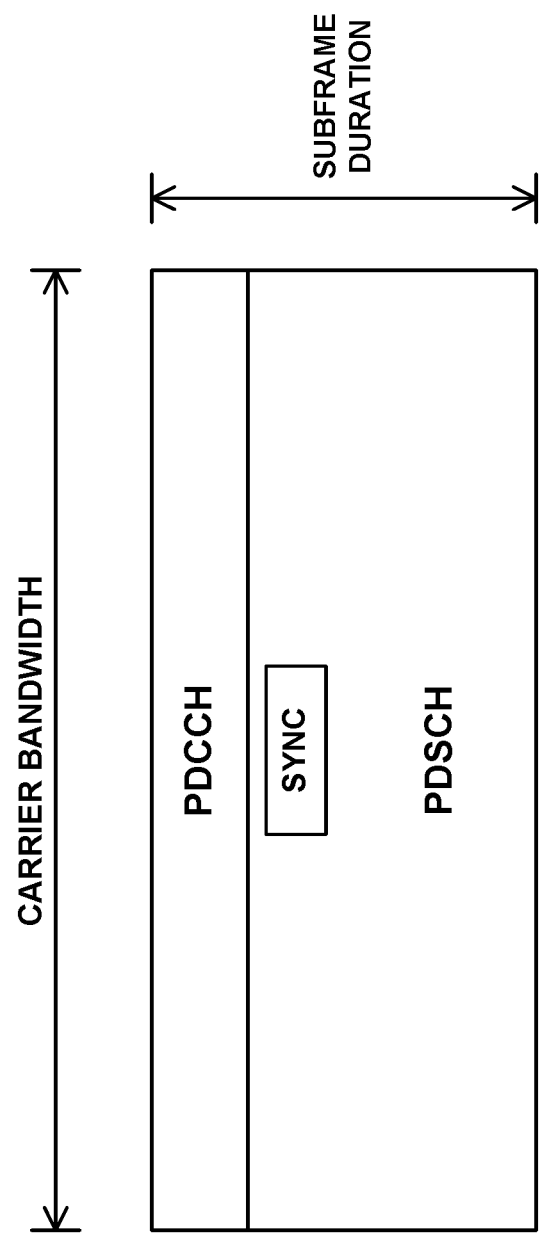
FIG. 4 is a simplified depiction of a downlink subframe
Figure 5:
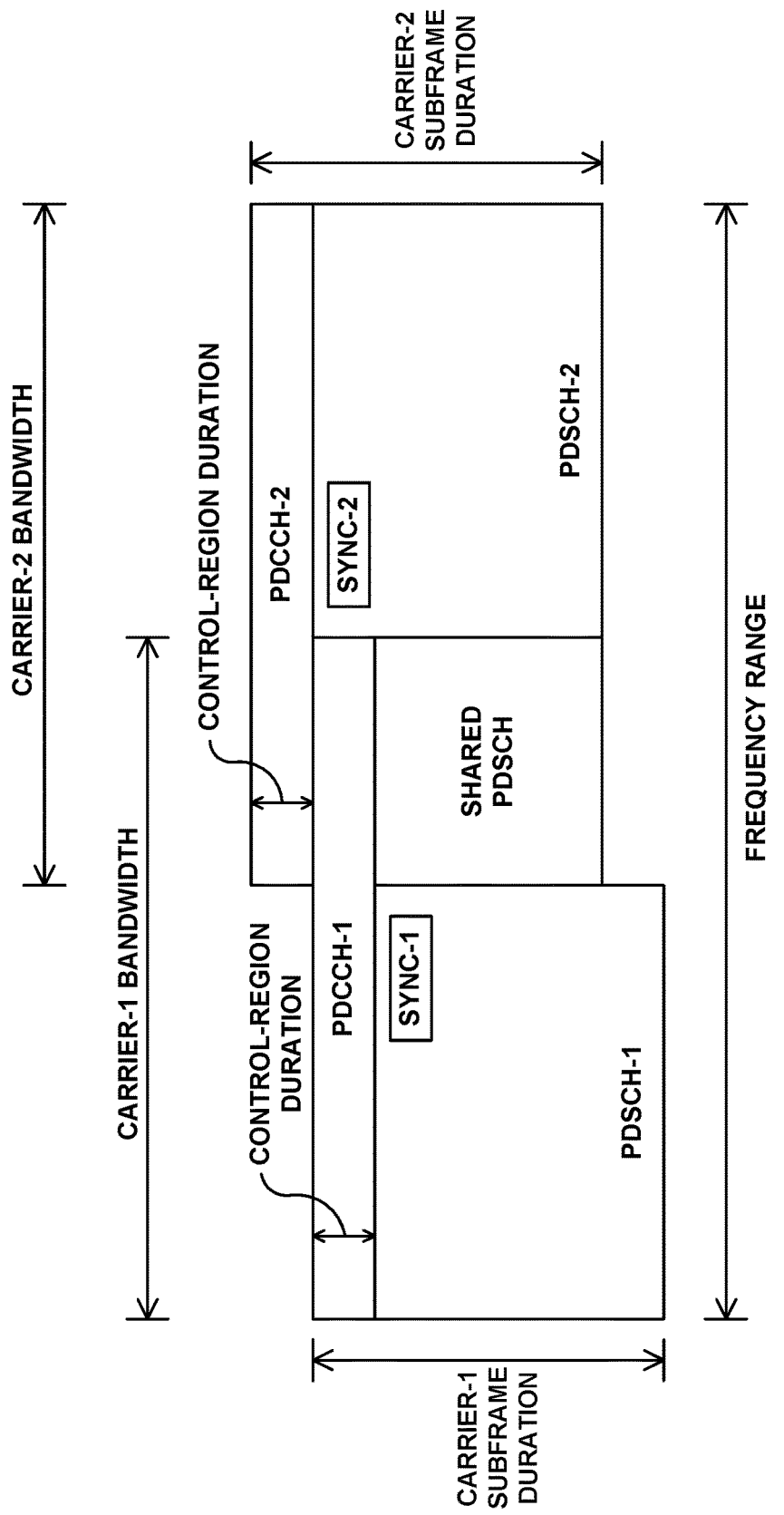
FIG. 5 is an illustration of how downlink subframes of partially overlapping carriers could be implemented.

FIGS. 4 and 5 next show how this can play out as to example downlink subframes.

FIG. 4 first illustrates in simplified form an example downlink subframe of a representative carrier. As shown, the carrier has a bandwidth (e.g., 10 MHz) and has a subframe duration (e.g., 1 ms). As discussed above, the subframe duration is then divided over time into at least a control-channel region, labeled PDCCH, and a shared-channel region, labeled PDSCH. In the illustrated arrangement, control-region has a control-region duration, which as noted above might be one, two, or three symbol time segments in duration. Further, the subframe includes carrier-synchronization signals, labeled SYNC, centered in the carrier bandwidth.

FIG. 5 then depicts a downlink configuration that can result from the base station providing service on two such carriers, carrier-1 and carrier-2, that the base station configures to partially overlap with each other in frequency and that the base station time-shifts in relation to each other. The figure illustrates the result of this configuration with respect to corresponding subframes of the carriers, such as with respect to the second subframe of a frame of one carrier and the second subframe of a frame of the other carrier for example.

In particular, FIG. 5 depicts the two carriers defined in a partially overlapping manner within a frequency range (e.g., 16 MHz), and with the carriers' respective subframes time-shifted from each other by a duration equal to the control-region duration. As shown, the synchronization signals of carrier-1 (labeled SYNC-1) would thus be time-shifted by duration 38 from the synchronization signals of carrier-2 (labeled SYNC-2).

With the example arrangement as shown, the control-region of each carrier advantageously spans the full bandwidth of the carrier, which is made possible by the time-shifting of the carriers in relation to each other. On the other hand, the shared-channel region of each carrier includes a carrier-specific portion and then an overlapping, shared portion. In particular, as shown, the control-region of carrier-1 (labeled PDCCH-1) spans the entire bandwidth of carrier-1, whereas the shared-channel region of carrier-1 includes a carrier-specific portion (labeled PDSCH-1) and a shared portion (labeled SHARED PDSCH). And the control-region of carrier-2 (labeled PDCCH-2) spans the entire bandwidth of carrier-2, whereas the shared-channel region of carrier-2 includes a carrier-specific portion (labeled PDSCH-2) and the shared portion (labeled SHARED PDSCH).

Notice that, with the configuration as shown in FIG. 5, SYNC-2 does not extend into PDCCH-1. As discussed above, however, there could be an implementation scenario where SYNC-2 does extend into PDCCH-1. For instance, given certain size frequency ranges and carrier bandwidths, the central resource elements that define the synchronization channels of carrier-2 could extend partly into the PDCCH of carrier-1. In this situation, control signaling using those same resource elements on carrier-1 could be precluded, as the synchronization signals of carrier-2 would take precedence for use of those resource elements, but such control signaling could be provided elsewhere in the control region of carrier-1. As a result, WCDs that are served on carrier-1 would not detect DCI messages in that high-end portion of the PDCCH of carrier-1 but could detect DCI messages elsewhere in the control region of carrier-1. Likewise, other control signaling (e.g., any Hybrid Automatic Repeat Request (HARD) messaging or the like) on carrier-1 could be avoided in that area of overlap but could be provided elsewhere in the control region of carrier-1.

Figure 6:
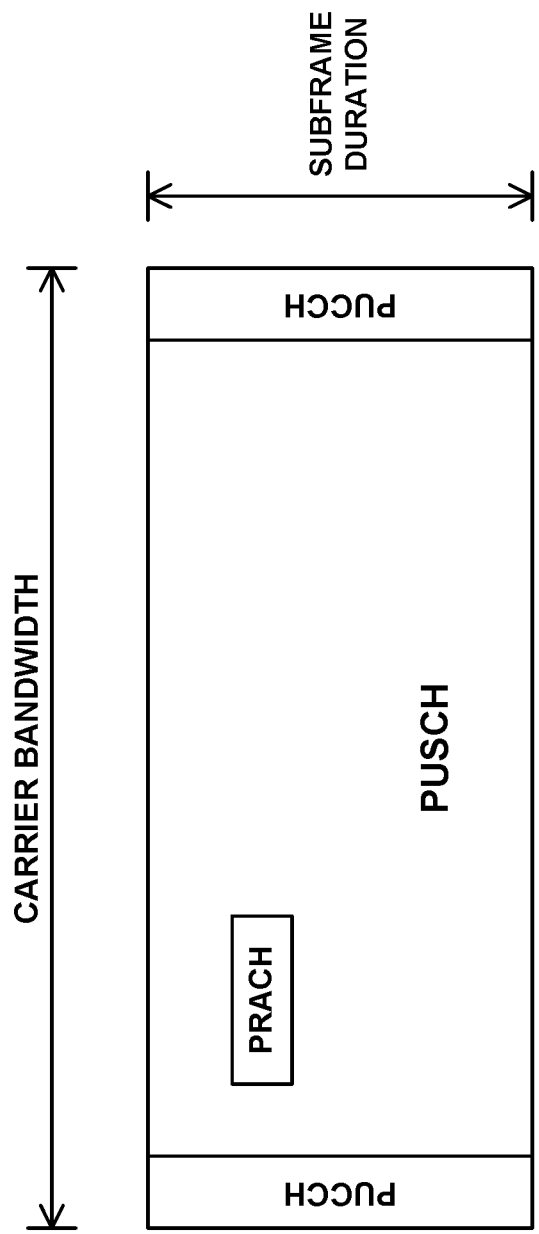
FIG. 6 is a simplified depiction of an uplink subframe
Figure 7:
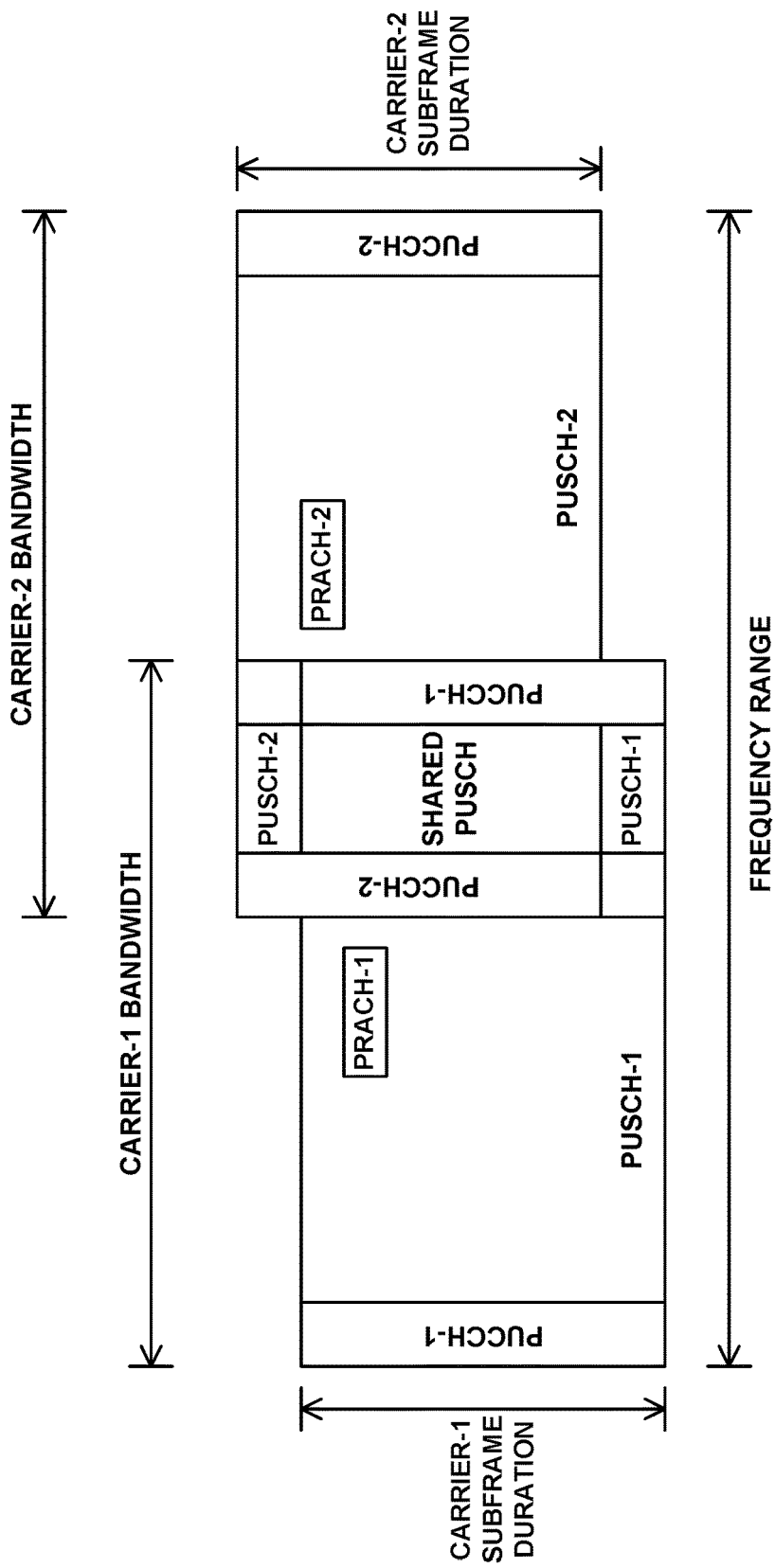
FIG. 7 is an illustration of how uplink subframes of partially overlapping carriers could be implemented.

FIGS. 6 and 7 next depict how this can play out as to example uplink subframes.

FIG. 6 first illustrates in simplified form an example uplink subframe of a representative carrier. Here again, the carrier has a bandwidth (e.g., 10 MHz) and a subframe duration (e.g., 1 ms). As discussed above, the uplink is then divided into a control-region, labeled PUCCH, at the two ends of the carrier bandwidth, and a shared-channel region, labeled PUSCH, that extends in between the two control region segments. In particular, the carrier's bandwidth extends from a low end (the lowest frequency of the carrier) to a high end (the highest frequency of the carrier), and the carrier has (i) a low end control-channel region at the low-end of the carrier, (ii) a high-end control channel region at the high-end of the carrier, and (iii) a shared-channel region extending from the low-end control channel region to the high-end control channel region. Further, the subframe includes a representative random-access channel instance, labeled PRACH.

FIG. 7 then depicts an uplink configuration that can result from the base station providing service on two such carriers, carrier-1 and carrier-2, that the base station configures to partially overlap with each other in frequency and that the base station time-shifts in relation to each other. As with the downlink illustration, the figure illustrates the result of this configuration with respect to corresponding subframes of the carriers, such as with respect to the second subframe of a frame of one carrier and the second subframe of a frame of the other carrier for example.

In particular, FIG. 7 depicts the two carriers defined in a partially overlapping manner within a frequency range (e.g., 16 MHz), and with the carriers' respective subframes time-shifted from each other by duration 38 for consistent timing with the downlink arrangement discussed above. With the example arrangement as shown, the overlapping frequency region 28 of the two carriers encompasses (i) the high-end control-channel region of the carrier-1, (ii) an overlap of the shared-channel regions of carriers 1 and 2, and (iii) the low-end control channel region of carrier-2. Further, the figure depicts separate PRACH instances in each carrier.

With these arrangements on the downlink and uplink, the base station can then provide service discretely on each carrier.

To facilitate this, WCDs could be provisioned with data defining each of these carriers, such as data specifying each carriers' respective center frequency and bandwidth as noted above. Thus, WCDs could detect coverage of either carrier as normal and could attach with the base station on a detected carrier as discussed above.

Further, in the overlapping frequency region respectively on each carrier, the base station would apply a scheduling process that would avoid resource conflicts given particular control channels on the other carrier.

For instance, on the downlink, the base station could restrict the shared channel region in each subframe to extend in time only so much as to not overlap with an adjacent control-channel region of the other carrier. In particular, when assigning PDSCH resources to carry data to WCDs, the base station could specifically avoid assigning PDSCH resources that would overlap with the control-channel region of the other carrier. Further, in the SHARED PDSCH region, the base station would avoid scheduling the same resources on both carriers at the same time. And on the uplink, the base station could restrict the shared channel region in each subframe to avoid conflicts with the control channel region of the other carrier, and in the SHARED PUSCH region, the base station would likewise avoid scheduling the same resources on both carriers at the same time.

Figure 8:
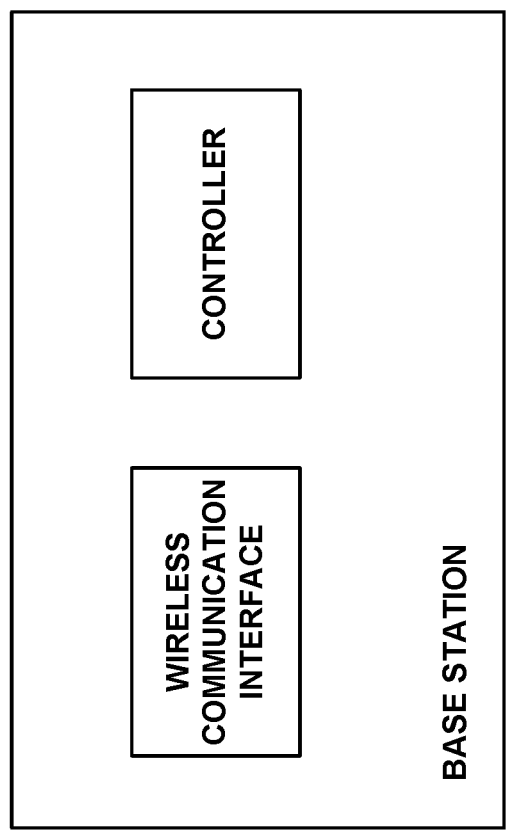
FIG. 8 is a simplified block diagram of a base station that could be configured to operate in accordance with the disclosure.

FIG. 8 is next a simplified block diagram of an example base station that could be configured to carry out features described herein. As shown, the example base station includes a wireless communication interface 80 and a controller 82. the wireless communication interface 80 could include an antenna structure, transceiver, and power amplifier, cooperatively configured to provide coverage on one or more defined carriers. The controller 82, which could comprise a baseband unit interconnected with the wireless communication interface and with the core network(s) for instance, could then include a processing unit (e.g., one or more microprocessors), non-transitory data storage, and program instructions stored in the data storage and executable by the processing unit to carry out various functions described herein.

Figure 9:
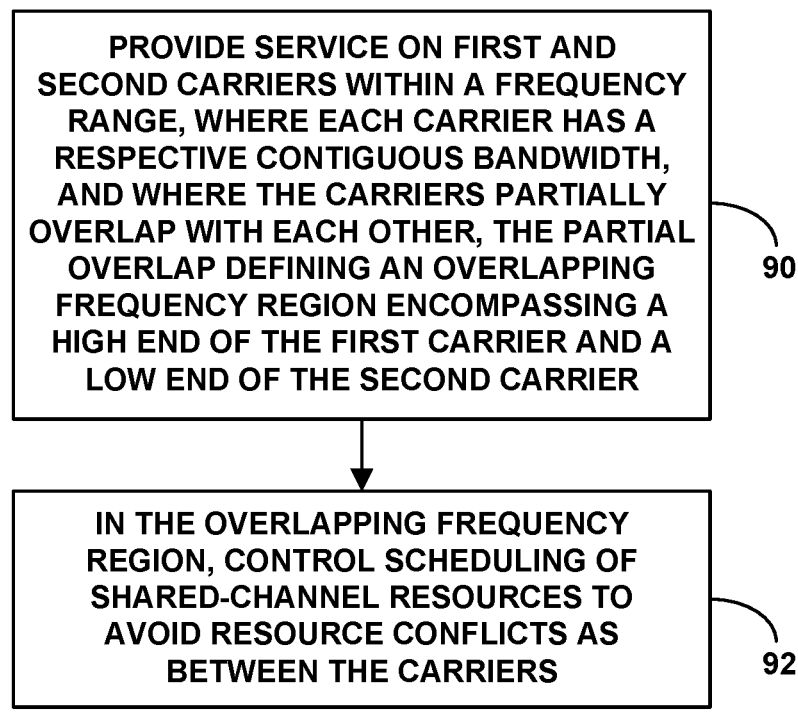
FIG. 9 is a flow chart depicting example operations in accordance with the disclosure.

FIG. 9 is next a flow chart depicting operations that can be carried out by an example base station in accordance with the present disclosure, to provide cellular wireless service on a plurality of overlapping carriers within a frequency range. As shown in FIG. 9, at block 90, the base station could provide service on first and second carriers (the same bandwidth as each other or different bandwidths than each other) within the frequency range, where each carrier has a respective contiguous bandwidth, and where the carriers partially overlap with each other, the partial overlap defining an overlapping frequency region encompassing a high end of the first carrier and a low end of the second carrier. Each carrier would thus comprise (i) a respective carrier-only frequency region and (ii) the overlapping frequency region. And at block 92, in the overlapping frequency region, the base station would control scheduling of shared-channel resources to avoid resource conflicts as between the carriers.

In this process, in line with the discussion above, the base station could thus serve first client devices (e.g., WCDs) on the first carrier and second client devices on the second carrier. And in this case, the base station could connect the first client devices via the first carrier with a first operator's core network and could connect the second client devices via the second carrier with a second operator's core network.

Further, as discussed above, the base station could broadcast periodically on each carrier respective carrier-synchronization signals centered in the carrier's bandwidth, and the broadcasting of the carrier-synchronization signals on the first carrier could occur on different subcarriers of the frequency range than the broadcasting of the carrier-synchronization signals on the second carrier. And this broadcasting of the carrier-synchronization signals on different subcarriers of the respective carriers could enable the carriers to be separately detected by client devices.

In addition, the base station could broadcast on each carrier a respective reference signal distributed in a pattern of resource elements throughout the carrier's bandwidth, and in the overlapping frequency region, the reference signal on the first carrier could occupy the same resource elements as the reference signal on the second carrier.

Figure 10:
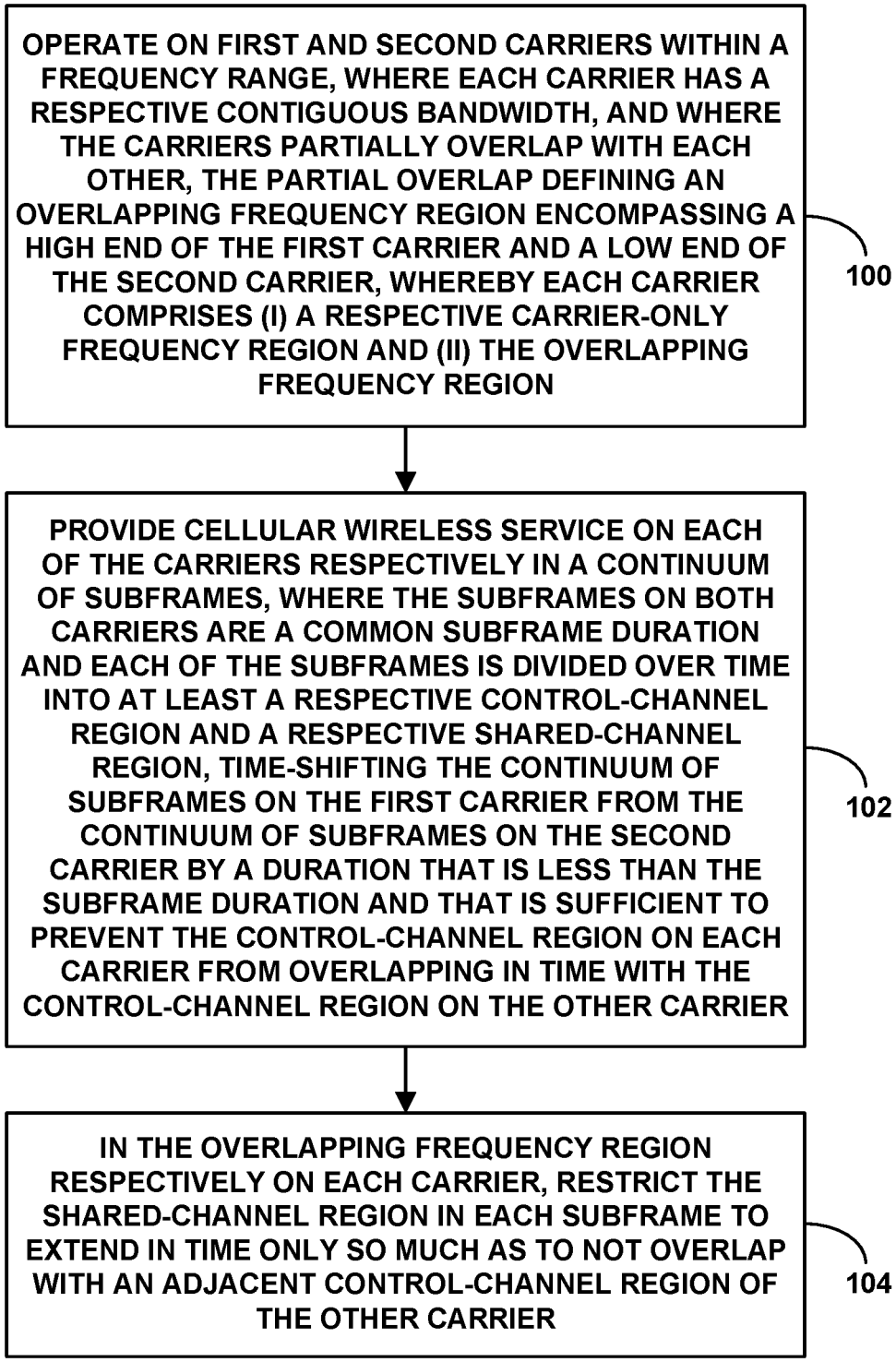
FIG. 10 is another flow chart depicting example operations in accordance with the disclosure.

FIG. 10 is next another flow chart depicting operations that can be carried out by an example base station in accordance with the present disclosure, to provide cellular wireless service on a plurality of overlapping carriers within a frequency range. As shown in FIG. 10, at block 100, the base station could operate on first and second carriers within the frequency range, where each carrier has a respective contiguous bandwidth, and where the carriers partially overlap with each other, the partial overlap defining an overlapping frequency region encompassing a high end of the first carrier and a low end of the second carrier, whereby each carrier comprises (i) a respective carrier-only frequency region and (ii) the overlapping frequency region.

At block 102 (concurrent with block 100), the base station could provide cellular wireless service on each of the carriers respectively in a continuum of subframes, where the subframes on both carriers are a common subframe duration and each of the subframes is divided over time into at least a respective control-channel region and a respective shared-channel region, where the base station time-shifts the continuum of subframes on the first carrier from the continuum of subframes on the second carrier by a duration that is less than the subframe duration and that is sufficient to prevent the control-channel region on each carrier from overlapping in time with the control-channel region on the other carrier. And at block 104 (also concurrent), in the overlapping frequency region respectively on each carrier, the base station could restrict the shared-channel region in each subframe to extend in time only so much as to not overlap with an adjacent control-channel region of the other carrier.

As discussed above, the base station could then allocate to served client devices shared-channel resources respectively on each carrier, to carry air interface communications between the served client devices and the base station. And in doing so, the base station could avoid concurrent allocation on both carriers of identical shared-channel resources of the overlapping frequency region.

Further, as discussed above, the control-channel region in each subframe could have a control-channel duration, and the act of time-shifting the continuum of subframes on the first carrier from the continuum of subframes on the second carrier by a duration that is less than the subframe duration and that is sufficient to prevent the control-channel regions on each carrier from overlapping in time with the control-channel regions on the other carrier could involve time-shifting the continuum of subframes on the first carrier from the continuum of subframes on the second carrier by the control-channel duration.

Figure 11:
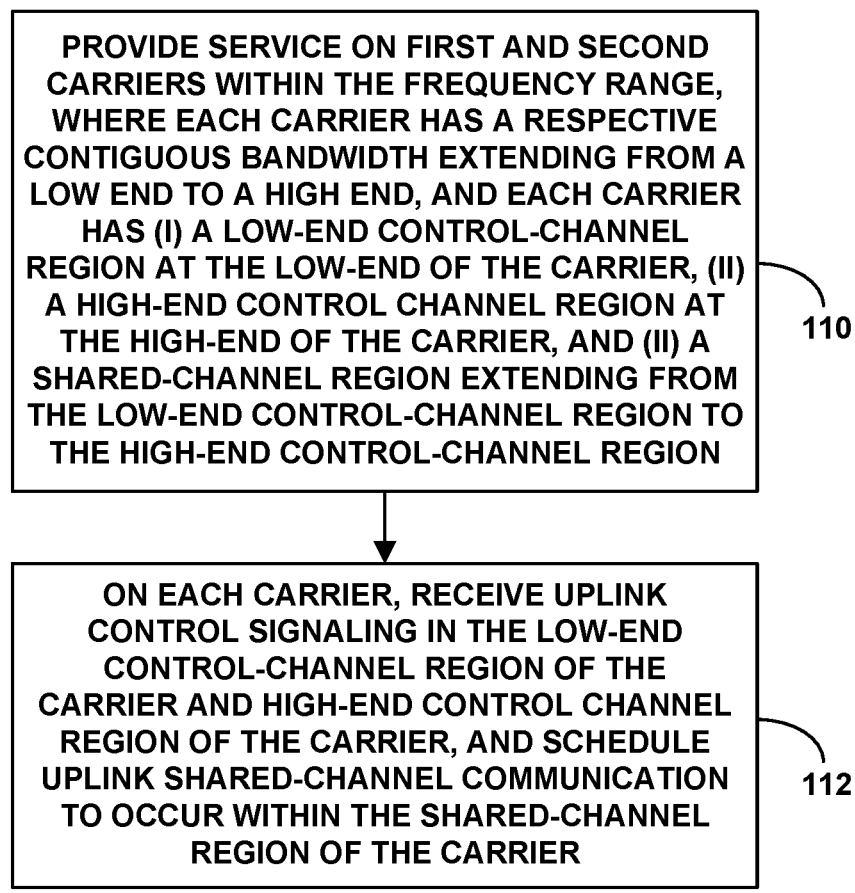
FIG. 11 is another flow chart depicting example operations in accordance with the disclosure.

Finally, FIG. 11 is a flow chart depicting operations that can be carried out by an example base station in accordance with the present disclosure, to provide cellular wireless service within a frequency range. As shown in FIG. 11, at block 110, the base station could provide service on first and second carriers within the frequency range, where each carrier has a respective contiguous bandwidth extending from a low end to a high end, and each carrier has (i) a low-end control-channel region at the low-end of the carrier, (ii) a high-end control channel region at the high-end of the carrier, and (ii) a shared-channel region extending from the low-end control-channel region to the high-end control-channel region. In particular, the first and second carriers could partially overlap with each other, the partial overlap defining an overlapping frequency region that encompasses (i) the high-end control-channel region of the first carrier, (ii) an overlap of the shared-channel regions of the first and second carriers and (iii) the low-end control-channel region of the second carrier.

Further, at block 112 (while providing such service), on each carrier, the base station could receive uplink control signaling in the low-end control-channel region of the carrier and high-end control channel region of the carrier, and the base station could schedule uplink shared-channel communication to occur within the shared-channel region of the carrier. And as discussed above, in doing this, the base station could avoid concurrent allocation of identical shared-channel resources in the overlapping frequency region.

As further noted above, on each carrier, the base station could allocate one or more random-access-channel instances in the shared-channel of the carrier. For instance, the base station could specify these instances in a broadcast system information message. Further, in doing this, (i) the base station could restrict the one or more random-access-channel instances in the first carrier to not overlap in frequency with the low-end control-channel region of the second carrier and (ii) the base station could restrict the one or more random-access-channel instances in the second carrier to not overlap in frequency with the high-end control-channel region of the first carrier. In addition, the base station could carry out similar features to help avoid resource conflicts with respect to other uplink control signaling, such as sounding reference signals and the like.

Exemplary embodiments have been described above. Those skilled in the art will understand, however, that changes and modifications may be made to these embodiments without departing from the true scope and spirit of the invention. Further, various features described above with respect to certain embodiments could be implemented in other embodiments described above as well.

We claim:

1. A method for a base station to provide cellular wireless service on a plurality of overlapping carriers within a frequency range, the method comprising:
   providing service by the base station on first and second carriers within the frequency range, wherein each carrier has a respective contiguous bandwidth, and wherein the carriers partially overlap with each other, the partial overlap defining an overlapping frequency region encompassing a high end of the first carrier and a low end of the second carrier, whereby each carrier comprises (i) a respective carrier-only frequency region and (ii) the overlapping frequency region;
   broadcasting by the base station on each carrier a respective reference signal distributed in a pattern of resource elements throughout the carrier's bandwidth, wherein in the overlapping frequency region, the reference signal on the first carrier occupies the same resource elements as the reference signal on the second carrier; and
   in the overlapping frequency region, controlling by the base station scheduling of shared-channel resources to avoid resource conflicts as between the carriers.

2. The method of claim 1, wherein the base station serves first client devices on the first carrier and the base station serves second client devices on the second carrier, the method further comprising:
   connecting by the base stations the first client devices via the first carrier with a first operator's core network; and
   connecting by the base station the second client devices via the second carrier with a second operator's core network.

3. The method of claim 1, further comprising broadcasting by the base station, periodically on each carrier, respective carrier-synchronization signals centered in the carrier's bandwidth, wherein the broadcasting of the carrier-synchronization signals on the first carrier occurs on different subcarriers of the frequency range than the broadcasting of the carrier-synchronization signals on the second carrier,
   whereby broadcasting of the carrier-synchronization signals on different subcarriers of the respective carriers enables the carriers to be separately detected by client devices.

4. The method of claim 1, wherein the frequency bandwidths of the carriers are the same as each other.

5. The method of claim 1, wherein the frequency bandwidths of the carriers are different than each other.

6. The method of claim 1, further comprising:
   allocating by the base station, to served client devices, shared-channel resources respectively on each carrier, to carry air interface communications between the served client devices and the base station,
   wherein controlling by the base station scheduling of shared-channel resources in the overlapping frequency region to avoid resource conflicts as between the carriers comprises, in the allocating, avoiding by the base station concurrent allocation on both carriers of identical shared-channel resources of the overlapping frequency region.

7. The method of claim 1, wherein providing service by the base station on first and second carriers comprises providing cellular wireless service by the base station on each of the carriers respectively in a continuum of subframes, wherein the subframes on both carriers are a common subframe duration and each of the subframes is divided over time into at least a respective control-channel region and a respective shared-channel region, wherein the base station time-shifts the continuum of subframes on the first carrier from the continuum of subframes on the second carrier by a duration that is less than the subframe duration and that is sufficient to prevent the control-channel region on each carrier from overlapping in time with the control-channel region on the other carrier.

8. The method of claim 7, further comprising:
   in the overlapping frequency region respectively on each carrier, restricting by the base station the shared-channel region in each subframe to extend in time only so much as to not overlap with an adjacent control-channel region of the other carrier.

9. The method of claim 7,
   wherein the control-channel region in each subframe has a control-channel duration, and wherein time-shifting the continuum of subframes on the first carrier from the continuum of subframes on the second carrier by a duration that is less than the subframe duration and that is sufficient to prevent the control-channel regions on each carrier from overlapping in time with the control-channel regions on the other carrier comprises:
   time-shifting the continuum of subframes on the first carrier from the continuum of subframes on the second carrier by the control-channel duration.

10. The method of claim 1,
   wherein each carrier has (i) a low-end control-channel region at the low-end of the carrier, (ii) a high-end control channel region at the high-end of the carrier, and (ii) a shared-channel region extending from the low-end control-channel region to the high-end control-channel region,
   wherein the overlapping frequency region encompasses (i) the high-end control-channel region of the first carrier, (ii) an overlap of the shared-channel regions of the first and second carriers and (iii) the low-end control-channel region of the second carrier, and
   wherein, on each carrier, the base station receives uplink control signaling in the low-end control-channel region of the carrier and high-end control channel region of the carrier, and the base station schedules uplink shared-channel communication to occur within the shared-channel region of the carrier, wherein the base station avoids concurrent allocation of identical shared-channel resources in the overlapping frequency region.

11. The method of claim 10, wherein on each carrier, the base station allocates one or more random-access-channel instances in the shared-channel of the carrier, and wherein (i) the base station restricts the one or more random-access-channel instances in the first carrier to not overlap in frequency with the low-end control-channel region of the second carrier and (ii) the base station restricts the one or more random-access-channel instances in the second carrier to not overlap in frequency with the high-end control-channel region of the first carrier.

* * * * *